United States Patent
Hakola et al.

(10) Patent No.: US 11,742,922 B2
(45) Date of Patent: Aug. 29, 2023

(54) COMMUNICATION DEVICE WITH ANTENNA PANELS AND METHOD THEREOF

(71) Applicant: Nokia Technologies Oy, Espoo (FI)

(72) Inventors: Sami-Jukka Hakola, Kempele (FI); Mihai Enescu, Espoo (FI); Timo Koskela, Oulu (FI); Juha Pekka Karjalainen, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/419,978

(22) PCT Filed: Jan. 11, 2019

(86) PCT No.: PCT/EP2019/050684
§ 371 (c)(1),
(2) Date: Jun. 30, 2021

(87) PCT Pub. No.: WO2020/143920
PCT Pub. Date: Jul. 16, 2020

(65) Prior Publication Data
US 2022/0094415 A1    Mar. 24, 2022

(51) Int. Cl.
*H04B 7/04* (2017.01)
*H04B 7/06* (2006.01)
*H04B 7/0404* (2017.01)

(52) U.S. Cl.
CPC ......... *H04B 7/0691* (2013.01); *H04B 7/0404* (2013.01)

(58) Field of Classification Search
CPC .. H04B 7/0689; H04B 7/0691; H04B 7/0693; H04B 7/02; H04B 7/04; H04B 7/0404; H04B 7/0408; H04B 7/0413; H04B 7/0456; H04B 7/10
See application file for complete search history.

(56) References Cited

U.S. PATENT DOCUMENTS

| | | | |
|---|---|---|---|
| 9,425,879 B2 * | 8/2016 | Bengtsson | H04B 7/063 |
| 2020/0067615 A1 * | 2/2020 | Ghanbarinejad | H04B 17/309 |
| 2020/0145062 A1 * | 5/2020 | Jung | H04W 48/20 |

FOREIGN PATENT DOCUMENTS

| | | |
|---|---|---|
| WO | WO 2010/129610 A2 | 11/2010 |
| WO | WO 2017/162293 A1 | 9/2017 |

OTHER PUBLICATIONS

NPL (EP 3618491 B1) discloses a reporting measurement method and apparatus. (Year: 2020).*
NPL (WO/2012/177801 A1) discloses method and system for deployment and control of small cells. (Year: 2012).*

* cited by examiner

*Primary Examiner* — Siu M Lee
(74) *Attorney, Agent, or Firm* — Harrington & Smith

(57) ABSTRACT

An apparatus in a communications device includes circuitry configured for determining one or more parameters for one or more downlink signals received by a plurality of antenna arrangements of a set of antenna arrangements and for causing the communications device to transmit to an access point using a subset of said set of antenna arrangements, the subset of said set of antenna arrangements being selected on the determined one or more parameter.

16 Claims, 10 Drawing Sheets

COMMUNICATION DEVICE WITH ANTENNA PANELS AND METHOD THEREOF

CROSS REFERENCE TO RELATED APPLICATION

This patent application is a U.S. National Stage application of International Patent Application Number PCT/EP2019/050684 filed Jan. 11, 2019, which is hereby incorporated by reference in its entirety.

FIELD

The present application relates to a method, apparatus, and computer program and in particular but not exclusively to where a communication device is provided with a plurality of antenna panels or the like.

BACKGROUND

A communication system can be seen as a facility that enables communication sessions between two or more entities such as user terminals, base stations and/or other nodes by providing carriers between the various entities involved in the communications path. In a wireless communication system at least a part of a communication session, for example, occurs over a wireless link.

A user can access the communication system by means of an appropriate communication device or terminal. A communication device of a user may be referred to as user equipment (UE) or user device. The communication system and associated devices typically operate in accordance with a given standard or specification which sets out what the various entities associated with the system are permitted to do and how that should be achieved. Communication protocols and/or parameters which shall be used for the connection are also typically defined.

SUMMARY

In a first aspect there is provided an apparatus in a communication device comprising means for: determining one or more parameters for one or more downlink signals received by a plurality of antenna arrangements of a set of antenna arrangements; and causing the communication device to transmit to an access point using a subset of said set of antenna arrangements, the subset of said set of antenna arrangements being selected on the determined one or more parameters.

The parameters may be measurements or characteristics or any other suitable parameter.

The means may be for determining using said determined one or more parameters the subset of said set of antenna arrangements.

The means may be for determining the subset of said set of antenna arrangements taking into account one or more transmit power back off requirements to be applied by said communication device.

The determining may use one or more threshold values.

The means may be for receiving one or more of said one or more threshold values from the access point.

The means may be for: causing information about said one or more parameters for said one or more of said antenna arrangements to be transmitted to the access point; and receiving information from the access point indicating said subset of antenna arrangements which are to be used to transmit to said access point.

The received information may comprise information assigning one or more resources to respective ones of said antenna arrangements of said subset of antenna arrangements.

The received information may comprise information relating to a sounding reference signal set for each of said antenna arrangements.

The means may be for selecting one or more antenna arrangements, from said subset of antenna arrangements indicated in said information received from said access point, to be used transmit to said access point.

The means may be for receiving information from said access point indicating one or more of: a maximum number of results to be reported to said access point; a maximum number of results which can be from a same antenna arrangement; and a criteria by which results to be reported to said access point are selected.

The one or more parameters may comprise one or more path loss parameters.

The means may be for causing the communication device to send information to said access point indicating a number of antenna arrangements which said communication device has.

The means may be for causing the communication device to send information to said access point indicating that said communication device supports selective use of one or more antenna arrangements of said set of antenna arrangements.

The means may be for deactivating one or more of said antenna arrangements.

The means may be for deactivating said one or more antenna arrangements when information associated with the respective antenna arrangement is not being reported to the access point.

The apparatus may comprise the communication device or be provided in the communication device.

In another aspect there is provided a method comprising: determining one or more parameters for one or more downlink signals received by a plurality of antenna arrangements of a set of antenna arrangements of a communication device; and causing the communication device to transmit to an access point using a subset of said set of antenna arrangements, the subset of said set of antenna arrangements being selected on the determined one or more parameters.

The parameters may be measurements or characteristics or any other suitable parameter.

The method may comprise determining using said determined one or more parameters the subset of said set of antenna arrangements.

The method may comprise determining the subset of said set of antenna arrangements taking into account one or more transmit power back off requirements to be applied by said communication device.

The determining may use one or more threshold values.

The method may comprise receiving one or more of said one or more threshold values from the access point.

The method may comprise: causing information about said one or more parameters for said one or more of said antenna arrangements to be transmitted to the access point; and receiving information from the access point indicating said subset of antenna arrangements which are to be used to transmit to said access point.

The received information may comprise information assigning one or more resources to respective ones of said antenna arrangements of said subset of antenna arrangements.

The received information may comprise information relating to a sounding reference signal set for each of said antenna arrangements.

The method may comprise selecting one or more antenna arrangements, from said subset of antenna arrangements indicated in said information received from said access point, to be used transmit to said access point.

The method may comprise receiving information from said access point indicating one or more of: a maximum number of results to be reported to said access point; a maximum number of results which can be from a same antenna arrangement; and a criteria by which results to be reported to said access point are selected.

The one or more parameters may comprise one or more path loss parameters.

The method may comprise causing the communication device to send information to said access point indicating a number of antenna arrangements which said communication device has.

The method may comprise causing the communication device to send information to said access point indicating that said communication device supports selective use of one or more antenna arrangements of said set of antenna arrangements.

The method may comprise deactivating one or more of said antenna arrangements.

The method may comprise deactivating said one or more antenna arrangements when information associated with the respective antenna arrangement is not being reported to the access point.

The method may be performed by an apparatus or a communication device. The apparatus may be provided in the communication device.

In another aspect there is provided an apparatus comprising: at least one processor and at least one memory including a computer program code, the at least one memory and computer program code configured to, with the at least one processor, cause the apparatus at least to: determine one or more parameters for one or more downlink signals received by a plurality of antenna arrangements of a set of antenna arrangements of a communication device; and cause the communication device to transmit to an access point using a subset of said set of antenna arrangements, the subset of said set of antenna arrangements being selected on the determined one or more parameters.

The parameters may be measurements or characteristics or any other suitable parameter.

The at least one memory and computer program code may be configured to, with the at least one processor, cause the apparatus at least to determine using said determined one or more parameters the subset of said set of antenna arrangements.

The at least one memory and computer program code may be configured to, with the at least one processor, cause the apparatus at least to determine the subset of said set of antenna arrangements taking into account one or more transmit power back off requirements to be applied by said communication device.

The determining may use one or more threshold values.

The at least one memory and computer program code may be configured to, with the at least one processor, cause the apparatus at least to receive one or more of said one or more threshold values from the access point.

The at least one memory and computer program code may be configured to, with the at least one processor, cause the apparatus at least to: cause information about said one or more parameters for said one or more of said antenna arrangements to be transmitted to the access point; and receive information from the access point indicating said subset of antenna arrangements which are to be used to transmit to said access point.

The received information may comprise information assigning one or more resources to respective ones of said antenna arrangements of said subset of antenna arrangements.

The received information may comprise information relating to a sounding reference signal set for each of said antenna arrangements.

The at least one memory and computer program code may be configured to, with the at least one processor, cause the apparatus at least to select one or more antenna arrangements, from said subset of antenna arrangements indicated in said information received from said access point, to be used transmit to said access point.

The at least one memory and computer program code may be configured to, with the at least one processor, cause the apparatus at least to receive information from said access point indicating one or more of: a maximum number of results to be reported to said access point; a maximum number of results which can be from a same antenna arrangement; and a criteria by which results to be reported to said access point are selected.

The one or more parameters may comprise one or more path loss parameters.

The at least one memory and computer program code may be configured to, with the at least one processor, cause the apparatus at least to cause the communication device to send information to said access point indicating a number of antenna arrangements which said communication device has.

The at least one memory and computer program code may be configured to, with the at least one processor, cause the apparatus at least to cause the communication device to send information to said access point indicating that said communication device supports selective use of one or more antenna arrangements of said set of antenna arrangements.

The at least one memory and computer program code may be configured to, with the at least one processor, cause the apparatus at least to deactivate one or more of said antenna arrangements.

The at least one memory and computer program code may be configured to, with the at least one processor, cause the apparatus at least to deactivate said one or more antenna arrangements when information associated with the respective antenna arrangement is not being reported to the access point.

The apparatus may comprise the communication device or be provided in the communication device.

In another aspect there is provided an apparatus in a access point comprising means for: receiving information about one or more parameters for one or more downlink signals received by a plurality of antenna arrangements of a set of antenna arrangements of a communication device; and causing information to be transmitted from the access point to said communication device, said information indicating a subset of antenna arrangements which are to be used by said communication device to transmit to said access point.

The parameters may be measurements or characteristics or any other suitable parameter.

The information to be transmitted from the access point may comprise information assigning one or more resources to respective ones of said antenna arrangements of said subset of antenna arrangements.

The information to be transmitted from the access point may comprise information relating to a sounding reference signal set for each of said antenna arrangements.

The means may be for causing information to be transmitted from said access point to said communication device indicating one or more of: a maximum number of results to be reported to said access point; a maximum number of results which can be from a same antenna arrangement; and a criteria by which results to be reported to said access point are selected.

The one or more parameters may comprise one or more path loss parameters.

The means may be for causing the access point to receive information from said communication device indicating a number of antenna arrangements which said communication device has.

The means may be for causing the access point to receive information from said communication device indicating that said communication device supports selective use of one or more antenna arrangements of said set of antenna arrangements The apparatus may comprise the access point or be provided in the communication device.

In another aspect there is provided an apparatus in a access point comprising means for: receiving information about one or more parameters for one or more downlink signals received by a plurality of antenna arrangements of a set of antenna arrangements of a communication device; and causing information to be transmitted from the access point to said communication device, said information indicating a subset of antenna arrangements which are to be used by said communication device to transmit to said access point.

The parameters may be measurements or characteristics or any other suitable parameter.

The information to be transmitted from the access point may comprise information assigning one or more resources to respective ones of said antenna arrangements of said subset of antenna arrangements.

The information to be transmitted from the access point may comprise information relating to a sounding reference signal set for each of said antenna arrangements.

The means may be for causing information to be transmitted from said access point to said communication device indicating one or more of: a maximum number of results to be reported to said access point; a maximum number of results which can be from a same antenna arrangement; and a criteria by which results to be reported to said access point are selected.

The one or more parameters may comprise one or more path loss parameters.

The means may be for causing the access point to receive information from said communication device indicating a number of antenna arrangements which said communication device has.

The means may be for causing the access point to receive information from said communication device indicating that said communication device supports selective use of one or more antenna arrangements of said set of antenna arrangements The apparatus may comprise the access point or be provided in the access point.

In another aspect there is provided an apparatus comprising: at least one processor and at least one memory including a computer program code, the at least one memory and computer program code configured to, with the at least one processor, cause the apparatus at least to:

receive information about one or more parameters for one or more downlink signals received by a plurality of antenna arrangements of a set of antenna arrangements of a communication device; and cause information to be transmitted from the access point to said communication device, said information indicating a subset of antenna arrangements which are to be used by said communication device to transmit to said access point.

The parameters may be measurements or characteristics or any other suitable parameter.

The information to be transmitted from the access point may comprise information assigning one or more resources to respective ones of said antenna arrangements of said subset of antenna arrangements.

The information to be transmitted from the access point may comprise information relating to a sounding reference signal set for each of said antenna arrangements.

The at least one memory and computer program code may be configured to, with the at least one processor, cause the apparatus at least to cause information to be transmitted from said access point to said communication device indicating one or more of: a maximum number of results to be reported to said access point; a maximum number of results which can be from a same antenna arrangement; and a criteria by which results to be reported to said access point are selected.

The one or more parameters may comprise one or more path loss parameters.

The at least one memory and computer program code may be configured to, with the at least one processor, cause the apparatus at least to cause the access point to receive information from said communication device indicating a number of antenna arrangements which said communication device has.

The at least one memory and computer program code may be configured to, with the at least one processor, cause the apparatus at least to cause the access point to receive information from said communication device indicating that said communication device supports selective use of one or more antenna arrangements of said set of antenna arrangements The apparatus may comprise the access point or be provided in the access point.

In another aspect there is provided a method comprising: receiving at an access point information about one or more parameters for one or more downlink signals received by a plurality of antenna arrangements of a set of antenna arrangements of a communication device; and causing information to be transmitted from the access point to said communication device, said information indicating a subset of antenna arrangements which are to be used by said communication device to transmit to said access point.

The parameters may be measurements or characteristics or any other suitable parameter.

The information to be transmitted from the access point may comprise information assigning one or more resources to respective ones of said antenna arrangements of said subset of antenna arrangements.

The information to be transmitted from the access point may comprise information relating to a sounding reference signal set for each of said antenna arrangements.

The method may comprise causing information to be transmitted from said access point to said communication device indicating one or more of: a maximum number of results to be reported to said access point; a maximum number of results which can be from a same antenna arrangement; and a criteria by which results to be reported to said access point are selected.

The one or more parameters may comprise one or more path loss parameters.

The method may comprise causing the access point to receive information from said communication device indicating a number of antenna arrangements which said communication device has.

The method may comprise causing the access point to receive information from said communication device indicating that said communication device supports selective use of one or more antenna arrangements of said set of antenna arrangements The method may be performed in an apparatus or in the access point. The apparatus may be provided in the access point.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
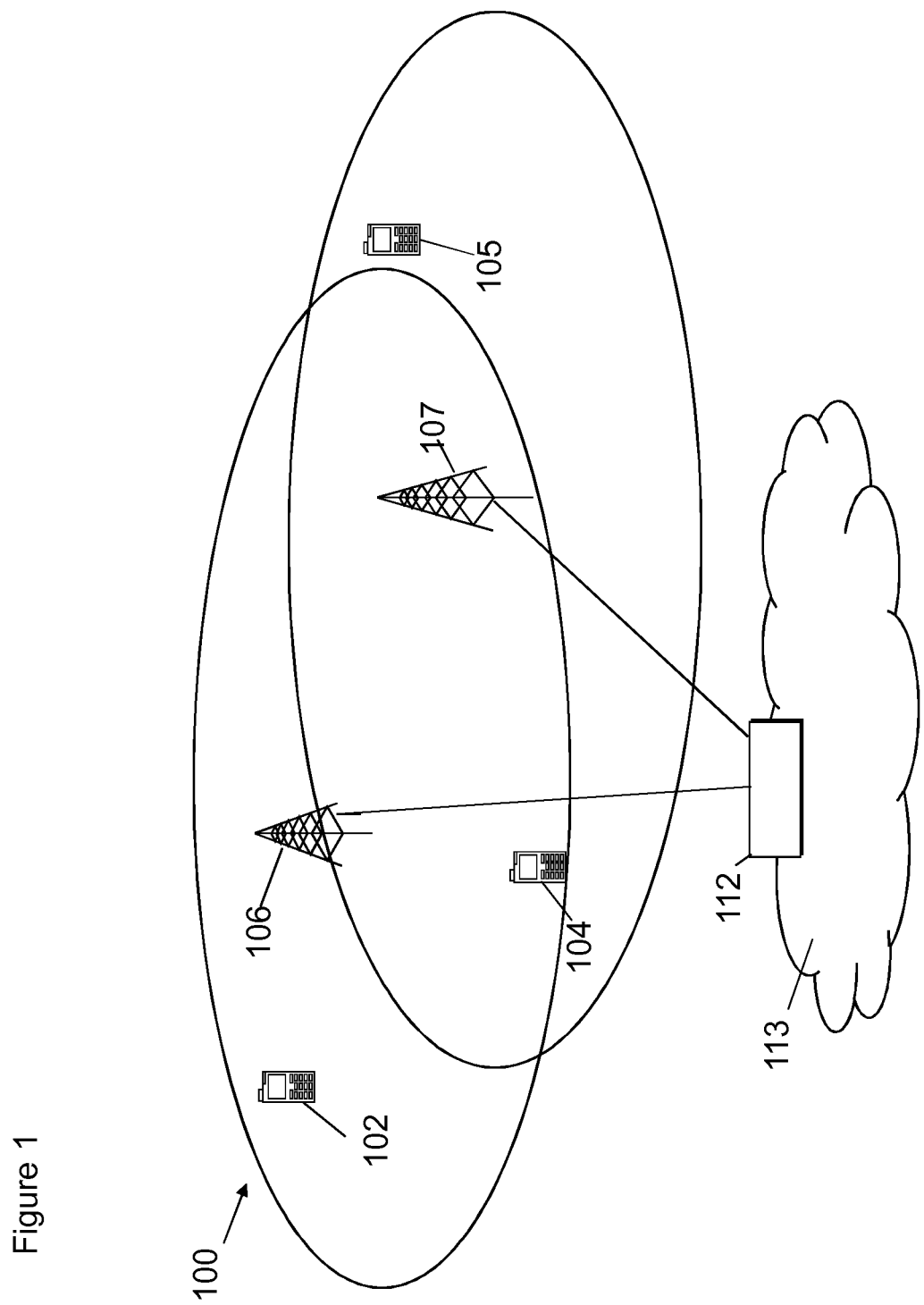
FIG. 1 shows a schematic diagram of an example communication system comprising a base station and a plurality of communication devices.

In a wireless communication system 100, such as that shown in FIG. 1, wireless communication devices or user equipment (UE) 102, 104, 105 are provided wireless access via at least one base station 106, 107 (e.g. next generation NB, gNB in a so-called 5G system) or similar wireless transmitting and/or receiving node or point.

In FIG. 1 base stations 106 and 107 are shown as connected to a wider communications network 113 via gateway 112. A further gateway function may be provided to connect to another network. A base station can provide coverage for an entire cell or similar radio service area.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). Other examples of radio access system comprise those provided by base stations of systems that are based on technologies such as wireless local area network (WLAN) and/or WiMAX (Worldwide Interoperability for Microwave Access). One example of a communications system is UTRAN (3G radio). Other examples of communication systems are the long-term evolution (LTE) of the Universal Mobile Telecommunications System (UMTS) based on the E-UTRAN radio-access technology, and so-called 5G system (5GS) including the 5G or next generation core (NGC) and the 5G Access network based on the New Radio (NR) radio-access technology. 5GS including NR are being standardized by the 3rd Generation Partnership Project (3GPP). These are by way of example only and there are various other standards with which some embodiments may alternatively or additionally be used.

Figure 2:
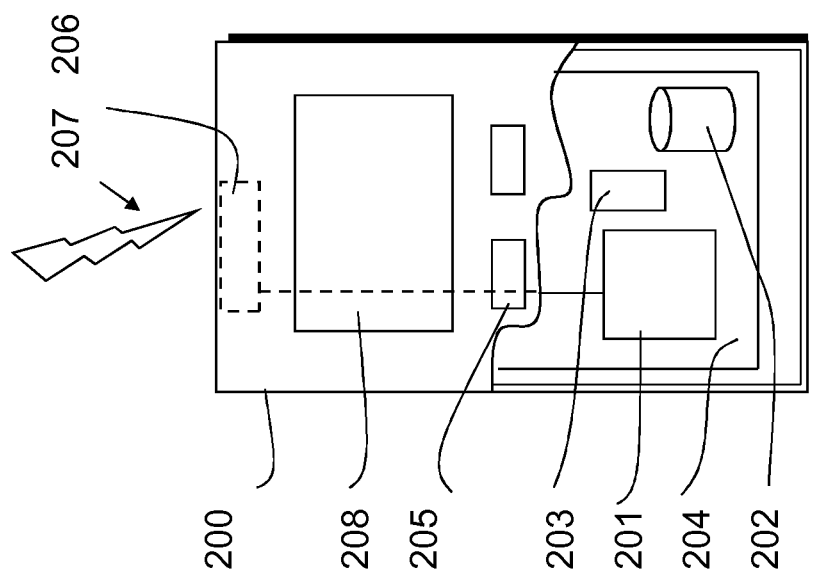
FIG. 2 shows a schematic diagram of an example communication device.

A possible wireless communication device will now be described in more detail with reference to FIG. 2 showing a schematic, partially sectioned view of a communication device 200. Some communication devices are referred to as user equipment (UE) or a terminal. An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, a machine type device, as part of an IoT (Internet of things) device, or any combinations of these or the like.

A wireless communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

A user may control the operation of the mobile device by means of a suitable user interface such as key pad 205, voice commands, touch sensitive screen or pad, combinations thereof or the like. This may be optional in some devices.

A display 208, a speaker and a microphone can be also provided. One or more of the display, speaker and microphone may be optional in some embodiments.

The wireless communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless communication device. The antenna arrangement may comprise one or more antenna panels or a set of antenna arrangements. This is described in more detail later.

It should be appreciated that a part of the communication device is which configured to perform one or more functions and/or processes may be referred to as an apparatus. The apparatus may be made up by at least one processor and at least one memory. The apparatus may take any suitable form such as integrated circuit, chip set or any other suitable form.

Figure 3:
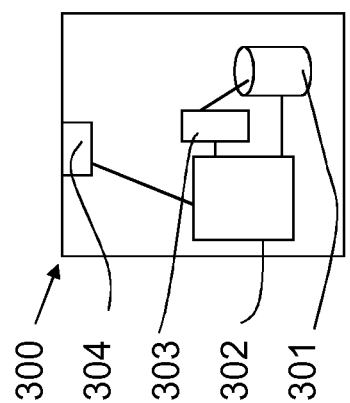
FIG. 3 shows a schematic diagram of an example control apparatus.

FIG. 3 shows an example embodiment of a control apparatus. This control apparatus may be provided in an access point such as a base station or the like. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Some embodiments may be used in relation to the physical layer design. By way of example only, some embodiments will be described in the context of 3GPP New Radio (NR) or 5G physical layer design. However, it should be appreciated that other embodiments may be used with any other standard.

Some embodiments may be used where there are a plurality of antenna panels or sets of antenna. An antenna panel or an antenna arrangement of a set of antenna arrangements may be provided by one or more individual antennas. The one or more individual antennas may be provided as an array in some embodiments. However, each panel or antenna arrangement may be considered to be a separate from other of the panels or antenna arrangements.

Each panel or antenna arrangement may for example be associated with a separate receive and/or transmit chain. In other embodiments, a receive and/or transmit chain may be shared by a plurality of panel or antenna arrangements. This may for example be on a time division multiplexing or the like. In this time division multiplexing scenario the chain may be "connected" to one panel or arrangement at a time.

Each panel or arrangement may be arranged so as to be physically separated from one or more of the other antenna panels or arrangements of the set of antenna arrangements. In some embodiments, the separation is sufficient to allow spatial diversity for one or more receive or transmit beams. In some embodiments, the different antenna arrangements may be provided on two or more sides and/or edges of a communication device.

In some embodiments two or more panels or arrangements may have overlapping spatial directions. By way of example only, two panels may cover partly the same spatial direction. In some embodiments, two or more panels or arrangements may at least partially physically overlap.

In some embodiments, an antenna panel or antenna arrangement may be for transmission and/or reception.

Each panel or antenna arrangement may create a directional transmission and/or reception pattern.

In some embodiments, the number of panels or antenna arrangements may be in the range of 2-8 panels or antenna arrangements. It should be appreciated that there may be other embodiments which use more than 8 panels or antenna arrangement.

The panels or antenna arrangements may be organized so that two panels or arrangements with different polarization are co-located. For example, the panels or antenna are arranged in pairs, with each one of the pair having a different polarization. A pair may be collocated. The different polarization may be vertical and horizontal, for example.

Each polarization dimension may be associated with the transmit and/or receive chain.

A beam is radiation pattern generated by one or multiple beams. Typically one panel or polarization dimension of one panel generates a beam. If the same signal is transmitted though the plurality of panels the resultant beam is a sum of individual beams from the panels. In some embodiments, one panel (may be one polarization dimension or two polarization dimensions of the collocated panels) may create the beam of interest.

Some embodiments may be used with multiple-input multiple output schemes.

Some embodiments may be used for beam management in relation to uplink UL transmission.

Some embodiments may be applied in the context of downlink transmission. In some embodiments, panel or antenna arrangement specific reporting may be used at a gNB to select one or more TX beams based on panel specific beam reports.

In some NR proposals, multi-beam operation may be used. This may be with over-6 GHz frequency band operation. Other embodiments may be used with frequency bands.

Some embodiments may provide a wireless communication device panel-aware UL transmission with a plurality of antenna panels or sets of antenna arrangements.

Some embodiments may address the acquisition of information relating to the properties of an uplink channel to a base station. This information may be channel state information CSI in some embodiments. The channel state information may comprise any suitable information relating to the state of the channel. By way of example only, the channel state information may comprise one or more reference signal received power measurement information, SINR (signal to interference noise ratio) measurement information, and channel quality indicator information.

Alternatively or additionally, this information may be a power headroom per uplink transmit beam. This may for example take into account one or more possible required power reduction to that specific spatial direction (TX beam). For example, if the beam points to human body, the UE may need to reduce transmission power.

Some embodiments may relate to the acquiring of this information prior to the scheduling of an uplink channel. By way of example only the uplink channel may comprise one or more of a physical uplink shared channel PUSCH, a physical uplink control channel PUCCH and a physical random access channel (PRACH). The PRACH may be a contention free PRACH. Some embodiments may be used in conjunction with a sounding reference signal SRS. In other embodiments, the uplink channel may be any other suitable channel.

An identifier (ID) may be used at least for indicating panel-specific UL transmission is supported, This identifier may be sent from the UE to the gNB in some embodiments Some embodiments may allow for the use of a plurality UE antenna panels for the codebook and/or non-codebook based UL channel transmission.

This channel may be a PUSCH.

Two transmission schemes are supported for PUSCH in Rel15 NR that support explicit TX beam indication: codebook based transmission and non-codebook based transmission. These are discussed in relation to FIGS. 9 and 10. The UE is configured with codebook based transmission when the higher layer parameter txConfig in PUSCH-Config is set to 'codebook', the UE is configured non-codebook based transmission when the higher layer parameter txConfig is set to 'nonCodebook'. If the higher layer parameter txConfig is not configured, the UE is not expected to be scheduled by DCI (downlink control indicator) format 0_1. If PUSCH is scheduled by DCI format 0_0, the PUSCH transmission is based on a single antenna port and TX beam is the same as for the PUCCH resource with the lowest ID within the active UL BWP (bandwidth part) of the cell.

Figure 9:
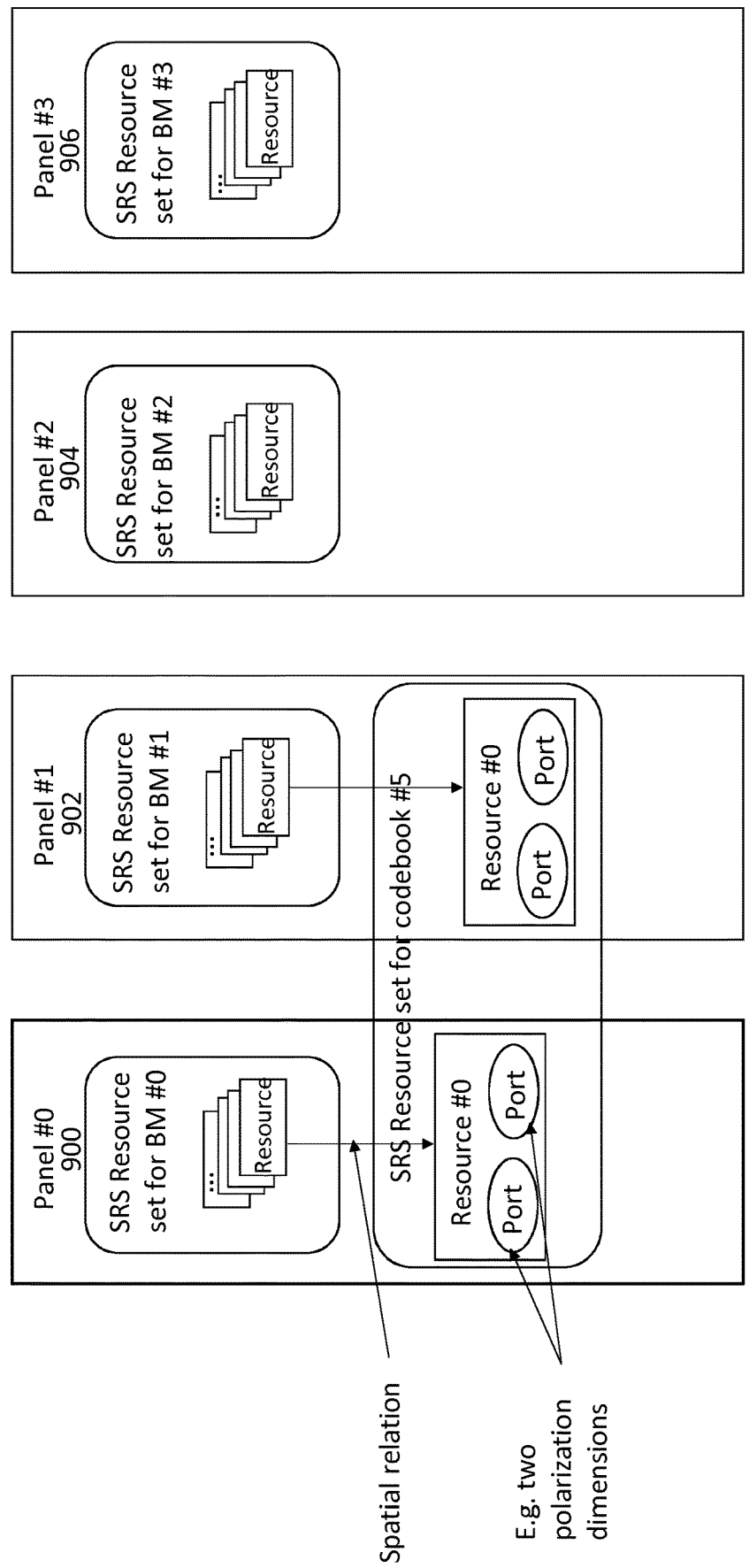
FIG. 9 shows a first example of a plurality of antenna panels of an UE.

Reference is made to FIG. 9 which schematically shows an arrangement where there are four antenna panels referenced 900, 902, 904 and 904. FIG. 9 illustrates a codebook based PUSCH.

The UE can be scheduled for codebook based PUSCH transmission by using DCI format 0_0, DCI format 0_1 or semi-statically configured to operate (also known as configured grant). For the codebook based transmission, the UE determines its PUSCH transmission precoder based on SRI (SRS resource indicator), TPMI (transmitted precoding matrix indicator) and the transmission rank from the DCI, given by DCI fields of SRI and precoding information and number of layers. For codebook based transmission, the UE may be configured with a single SRS-resource set to 'codebook' and only one SRS resource is indicated based on the SRI from within the SRS resource set. Each resource may represent a TX beam. Max 16 resources per set. The maximum number of configured SRS resources for codebook based transmission is 2 in current proposals. Each resource can be referred to a TX beam realization, i.e. gNB may select one of the two candidate TX beams for the PUSCH transmission as illustrated in FIG. 9. In the example shown in FIG. 9, the SRI in DCI selects SRS Resource #0 that represents certain TX beam.

Figure 10:
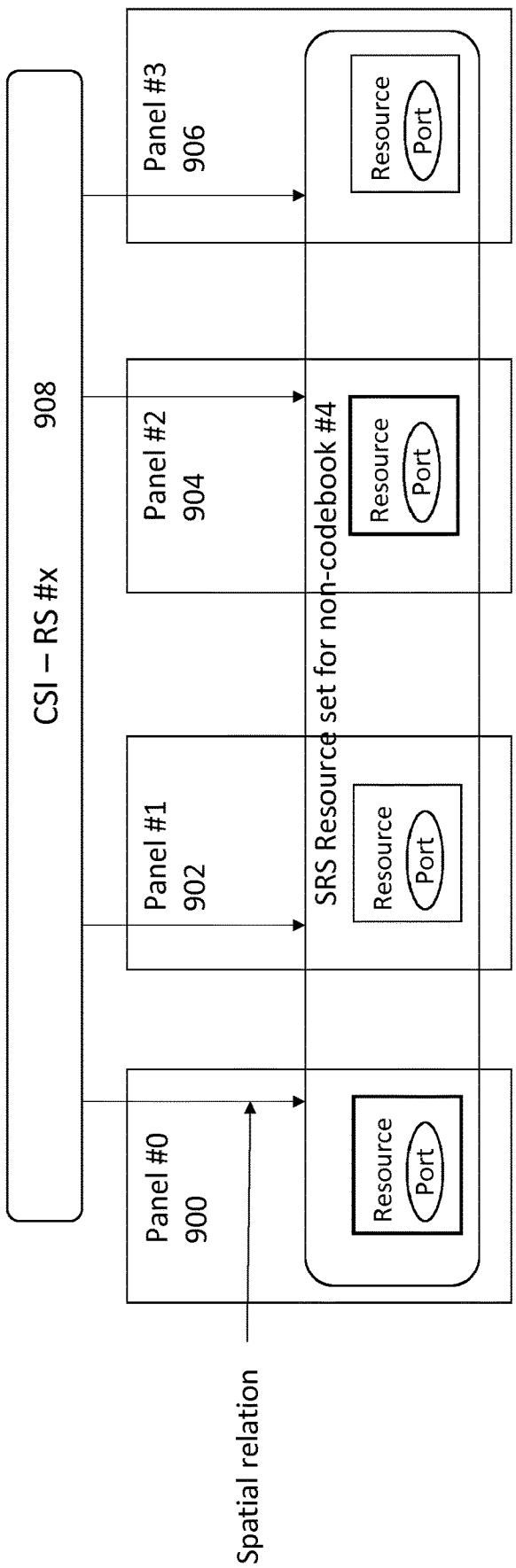
FIG. 10 shows a second example of a plurality of antenna panels of a UE.

Reference is made to FIG. 10 which schematically shows an arrangement where there are four antenna panels referenced 900, 902, 904 and 904. FIG. 10 illustrates a non-codebook based PUSCH.

For non-codebook based transmission, PUSCH can be scheduled e.g. by DCI format 0_0, DCI format 0_1 or semi-statically configured to operate (also known as configured grant). The UE can determine its PUSCH precoder and transmission rank based on the wideband SRI when multiple SRS resources are configured, where the SRI is given by the SRS resource indicator in DCI or the SRI is given by srs-resource indicator (semi-static allocation). The UE may use one or multiple SRS resources (i.e. TX beam(s)) for SRS transmission, where the number of SRS resources which can be configured to the UE for simultaneous transmission is a function of the UE capability (i.e. how many panels at UE). There may be only one associated CSI-RS resource 908 based on which the UE determines the precoder for each of the TX beams (i.e. for each SRS resource of the SRS resource set configured). Only one SRS port for each SRS resource may be configured. Only one SRS resource set may be configured with a higher layer parameter usage in SRS-resource set to 'non codebook'. The maximum number of SRS resources that can be configured for non-codebook based uplink transmission may be 4. The PUSCH scheduling command may have a SRI field that indicates that the UE should transmit a PUSCH using one or simultaneous multiple TX beams that are the same as used for the SRS resources the SRI is pointing to as shown in FIG. 10.

In the example shown in FIG. 10, the SRI in DCI selects TX beams from panel #0 900 and panel #2 904 for the PUSCH.

The antenna panels may be located on different sides of a UE. This may be for to provide spherical coverage in spatial domain. This may be used for FR2 frequencies. FR 2 frequencies may in the range of 24 GHz to 52.6 GHz. However, these values are by of example and other embodiments may be used with other frequencies in other embodiments. For example, there may be four panels each located on one side of the UE. That may mean that certain DL TX beams at one TRP (transmission reception point) can be detected in one or two panels and for the rest of the panels the detected signal strength is typically lower as beams of these panels are pointing in the opposite direction).

For the uplink SRS transmissions of the SRS resource set provided by the UE, the gNB can detect signal at a good level from the panel(s) pointing towards the receiving TRP while SRSs from other panel(s) will tend to have a lower signal.

Some embodiments may provide a mechanism to prevent a UE from using one or more antenna panels with a relatively low link quality for the uplink beam training and uplink SRS transmission. This mechanism may be initiated by the UE.

In some embodiments, a gNB or other access point is to identify UE panels. In some embodiments the gNB or other access point may be able to assign certain SRS resource(s) (or SRS resource set(s)) to a particular UE panel. In some embodiments, this may be achieved by including the panel ID in a SRS resource configuration.

Figure 4:
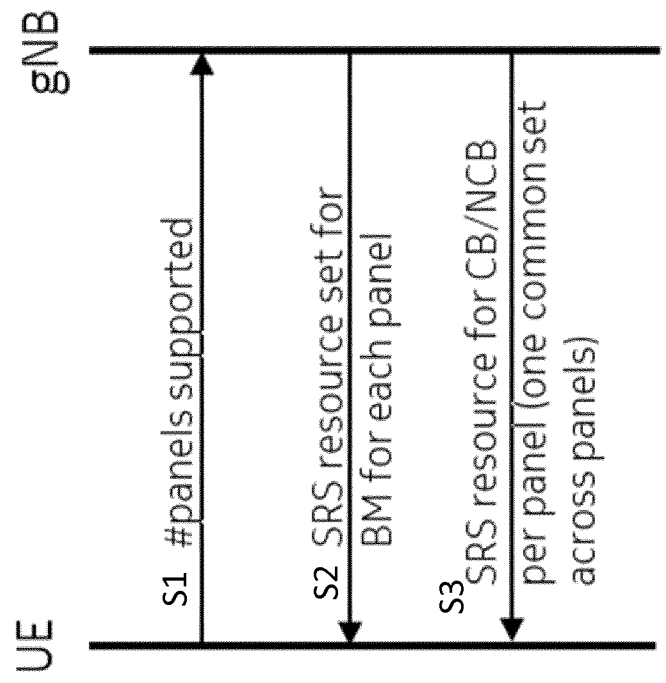
FIG. 4 shows a signal flow between a UE and an access point.

Reference is made to FIG. 4 which shows an example of the signal messaging of some embodiments.

In step S1, an apparatus of the UE is configured to cause information to be sent to the gNB or other access point. This information may comprise information about the number of panels supported by the UE.

In step S2, an apparatus of the gNB or other access point is configured to cause information to be sent to the UE. The information may comprise a SRS set for beam management BM for each panel.

In step S3, the apparatus of the gNB or other access point is configured to cause information to be sent to the UE. The information may comprise a SRS for code book and/or non codebook based PUSCH. This may be per panel. There may be one common set across panels.

In some embodiments, the information of steps S2 and S3 may be sent in either order or together.

In some embodiments, an apparatus of the UE may perform a method to determine feasibility of a plurality of antenna-panels uplink transmission. Alternatively or additionally, the apparatus may select one or more or all of the set of the antenna panels which are configured for transmission. The apparatus may be configured to cause the UE to transmit using the selected antenna panels:

In some embodiments, the apparatus of the UE may use a threshold value or values for the dynamic assessment for the selection of the panels.

In some embodiments, alternatively or additionally, the apparatus of the UE may have a single absolute threshold value. This may be associated with single SRS resource. The SRS resource may have a spatial relationship to a downlink reference signal resource. The SRS resource may have a spatial relationship to the downlink reference signal with a relatively strong received strength. For example, the downlink reference signal may be a CSI-RS resource. This downlink reference signal may be associated with a maximum L1-RSRP (reference signal received power) value of UE beam report.

One or more other SRS resources may be configured commonly or separately. This may be with a single or a plurality of relative offset values with respect to the single absolute threshold value.

Figure 5:
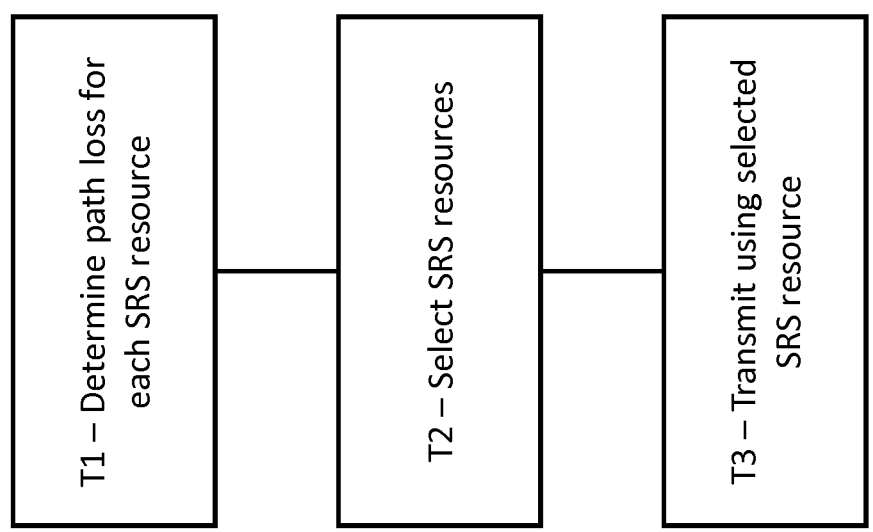
FIG. 5 shows a flowchart of an embodiment.

Reference is made to FIG. 5 which shows a method performed by an apparatus of a UE.

The method of FIG. 5 may performed when the UE is preparing to transmit on reference signal resources.

For example, the method of FIG. 5 may be performed when the UE is preparing to transmit on one or more of: configured (periodic SRS) SRS resources; activated (semi-persistent SRS) resources; and triggered (aperiodic SRS) SRS resources. The SRS resources may be of a SRS resource set.

In step T1, the apparatus determines the individual path loss value for each SRS resource. Each resource may be associated with a beam.

The apparatus may determine the corresponding path loss compensation value. This determined path loss value may be determined based on the given resource of the downlink RS based from which the precoder(s) for the SRS resources are determined.

In some embodiments, the gNB provides the transmit power for the downlink signal and optionally a compensation factor [0, 1]. The UE may determine the path loss compensation value as a difference from a measured downlink received power and a given transmit power. This difference may be multiplied with the compensation factor.

In step T2, the apparatus of the UE selects the SRS resource with the best path loss value. The apparatus of the UE may select from other SRS resources the ones for which the path loss value is within the configured threshold from the SRS resource with the best path loss value.

In step T3, the apparatus of the UE performs the uplink transmission using the selected SRS resources.

In some embodiments, the threshold may be based on a power headroom value or a metric that reveals achievable transmission power taking into account required power reductions. This may be satisfy one or more criteria or requirement. One example is to satisfy an emission safety limit. User equipment may need to comply with emission safety requirement and as such may be provided with proximity sensors so it can be determined when an intended transmission beam would be pointing towards the human body. The criteria or requirement may alternatively or additionally comprise one or more of prevention of overheating requirements and satisfying requirements relating to adjacent channel leakage ratio.

In some embodiments, the UE uses DL/UL beam correspondence to determine which uplink RSs are within the path gain threshold. The downlink measurement is used to determine uplink transmission parameters where RX/TX beam correspondence is utilized. The UE supports RX/TX beam correspondence in order to determine the TX beam to be used in the uplink from RX beam used to measure the DL signal.

Figure 6:
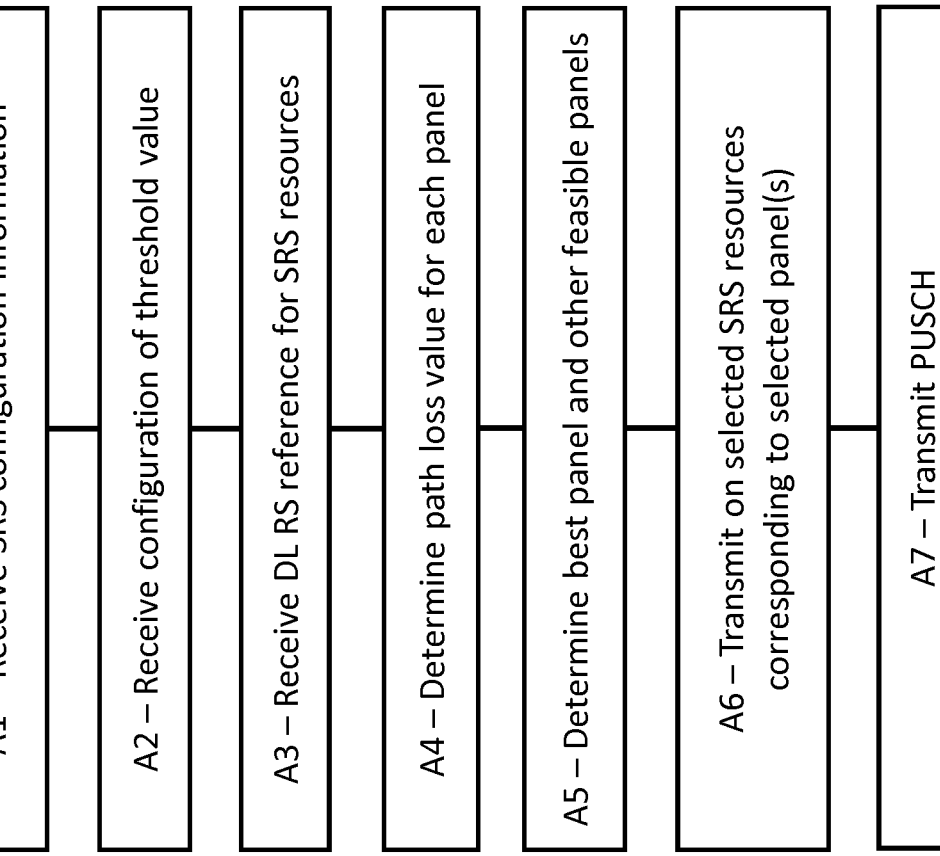
FIG. 6 shows a flowchart of another embodiment.

Another embodiment which is performed by an apparatus of a UE will now be described with reference to FIG. 6

In step A1, the UE receives information about the configuration of SRS resources. This may be of the SRS resource set. This may be for an uplink channel. By way of example only, this channel may be the PUCSH. The information may be for a CB and/or NCB PUSCH. This information may be provided to an apparatus of the UE. This information may be transmitted to the UE from a gNB.

In step A2, the UE receives information about the configuration of the threshold value for assessment of the panels suitable for the SRS transmission. This information may be transmitted to the UE from a gNB.

In step A3, the UE may receive information about individual DL RS for the SRS resources or a common one for the set. This information may be transmitted to the UE from a gNB.

It should be appreciated that the information from one or more of steps A1 to A3 may be sent in combination. It should be appreciated that the information of steps A1 to A3 may be provided in any order.

In step A4, the apparatus of the UE determines a path loss value/path loss compensation value for each panel (and beam of the panel).

In step A5, the apparatus of the UE determines the best panel and determines which other panel(s) (and beam(s)) are feasible. The best panel may be on having a lowest path loss value. Feasible panel(s) (and beam(s)) may be one(s) of which path loss value are within configured threshold from the best value. The best panel may be determined in any other suitable way. For example a best panel may be one which has a highest calculated power headroom (i.e. lowest estimated transmit power required)

In step A6, the apparatus of the UE may cause the UE to transmit on selected SRS resources that correspond to the selected panel(s) and beam(s) in step A5, This may be regards as the first selection stage.

In step A7, the apparatus of the UE determines that UL grant for PUSCH transmission is scheduled to the UE and causes the UE to transmit the PUSCH using TX beams corresponding to SRS resources indicated by SRI in the grant. In some embodiments, there may be no second selection stage as there is no feedback from gNB to indicate that it received the selected SRSs.

Figure 7:
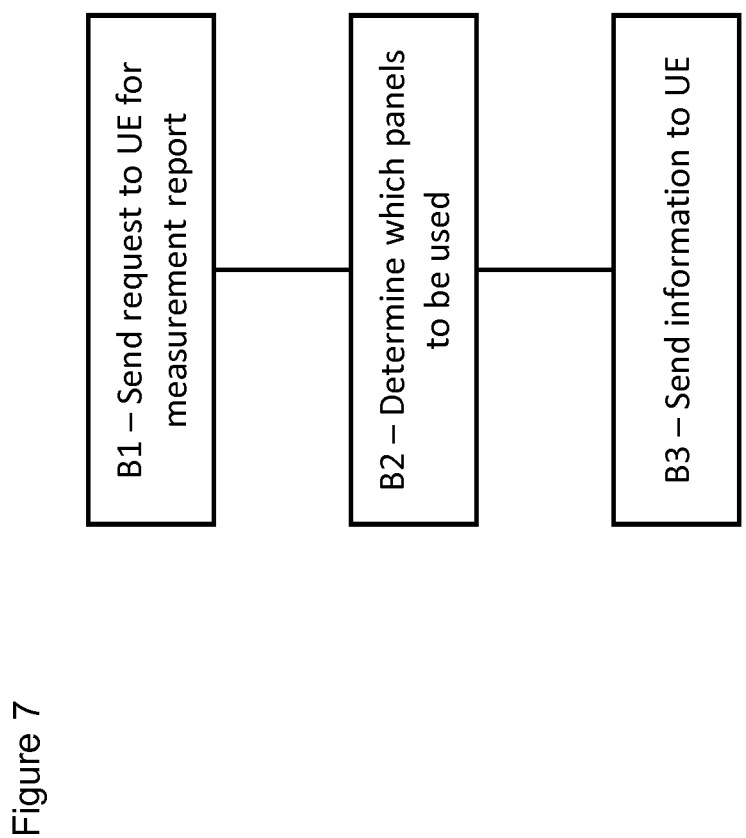
FIG. 7 shows a flowchart of another embodiment.

In other embodiments, an apparatus of the gNB is able to control dynamically the antenna panels which are used for the uplink SRS resource transmissions. In this regard reference is made to FIG. 7.

In step B1, the apparatus of the gNB may request a UE to provide antenna panel specific beam measurement reports.

In step B2, the measurement reports are received by the gNB and are used by the apparatus of the gNB to be aware of which UE panels are used to receive certain (e.g. relatively strong) gNB side TX beams associated with resources of a downlink RS or signal. This may mean that those panels could be used to generate TX beams in in the uplink using the reported TX beams, and the RSs characterizing the beams, to generate the UL TX beams. This may be based on DL/UL beam correspondence at UE meaning that the UE may determine UL TX beam from the DL RX beam used to receive and measure DL RS or signal. Based on the received beam reports the gNB would be able to determine which one or more antenna panels and optionally beams would be suitable for uplink transmission(s) towards the TRP(s) of the gNB.

In some embodiments, the UE may be configured with one or more of three controlling parameters, M, N and X. N may define that the UE reports a maximum number N beam measurement results. M may define the number of best value results among all the measurement results. If the first M results are from one panel only, the UE may provide N-M measurement results from the second best panel. This may be limited to where the values are within X dB from the best value from the best panel.

Using this reporting method the gNB would get information from other panels which do not have the best beams but still provide relatively good beams. That information may be useful for example to be able to configure beam diversity transmission.

In another embodiment, the apparatus of the gNB may request the UE to provide reports for a given RS resource set from a maximum of K groups. The grouping may be determined by the configuration of the UE. The gNB may not have exact knowledge of the actual number of beams in UE. The apparatus of the UE may cause the UE to report the results for the given RS resources based on different groups, up to K groups. The groups would be dependent on the configuration of the UE.

Based on provided reports the gNB performs the selection. The gNB makes the first stage selection for the beams and/or the panels. UE may then make further selection among the panels instructed by the gNB.

In step B3, the apparatus of the gNB cause the gNB to transmit information to the UE.

This information may be provided as part of a semi-persistent SRS resource set (re-)activation. The information provided by the gNB may indicates the SRS resources of the set to be actually transmitted by the UE.

Alternatively or additionally, this information may be provided as part of the dynamic aperiodic SRS resource set triggering. This may be via the downlink control indicator (DCI)). This may indicates the SRS of the set to be actually transmitted.

Figure 8:
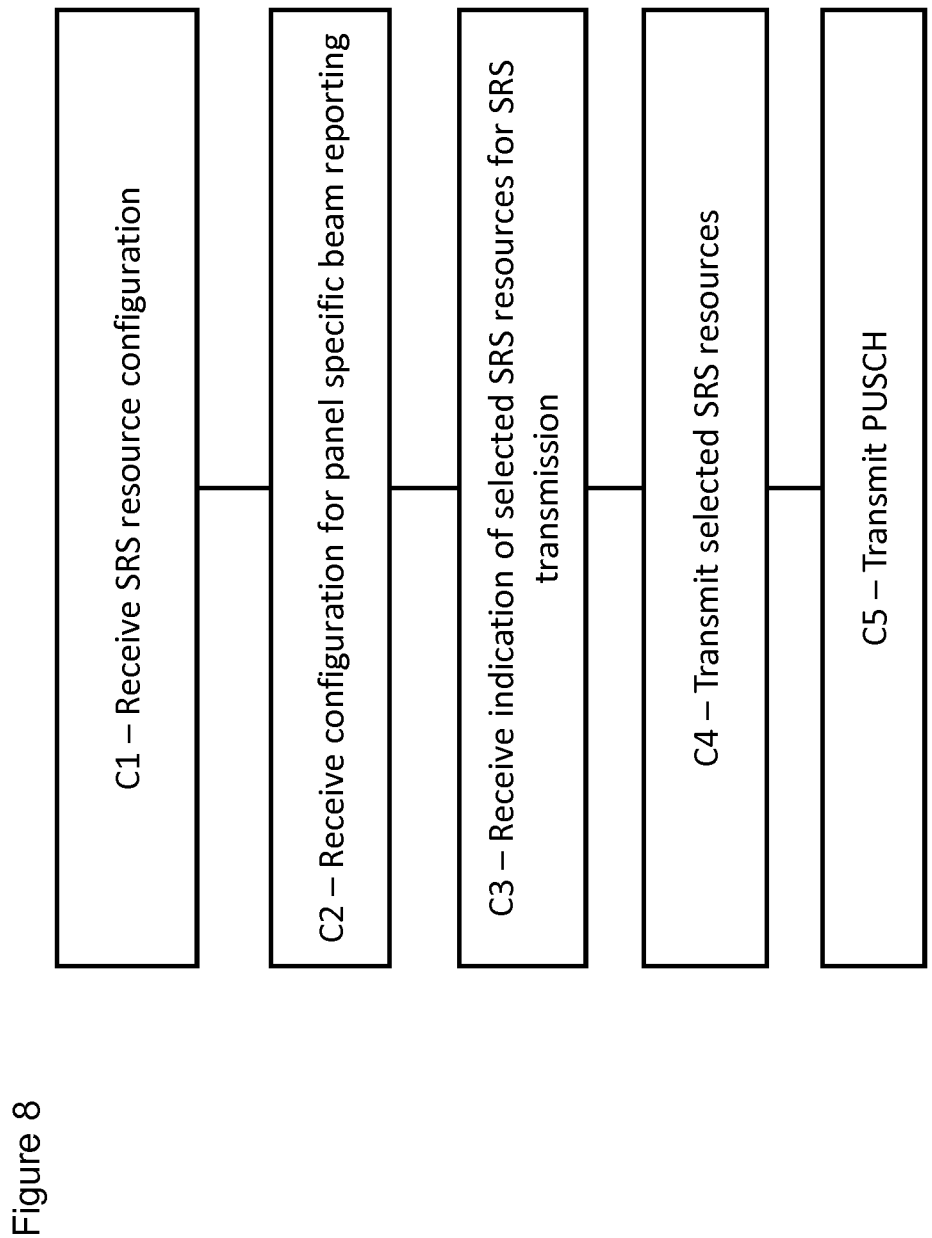
FIG. 8 shows a flowchart of another embodiment.

Reference is made to FIG. 8 which shows steps performed by an apparatus of a UE and/or the UE.

In step C1, the UE receives configuration information from a gNB or other access point. The configuration information may information about the SRS resources of the SRS resource set. This may be for a codebook based PUSCH. For example, each SRS resource may corresponds to an antenna panel or antenna group of the UE. This information may be provided to an apparatus of the UE.

In step C2, the UE receives configuration information from a gNB or other access point. This information may be configuration information for the panel specific beam reporting.

The information of step C1 and C2 may be received together or separately. The information of step C1 may be received before the information of step C2 or vice versa.

The configuration information may for example indicate that the apparatus of the UE include a panel identifier together with one or more of a measured resource ID and a measurement value.

Alternatively or additionally the gNB may in the request ask the UE to provide N best TX beams when measured using the certain panel ID. The UE may provide a DL TX beam measurement performed one panel at a time, i.e. UE panel specific DL TX beam measurements. In a baseline system the UE may use one or more panels for DL TX beam measurements (which is determined by the UE) but there is no ordering from gNB to request panel specific reporting.

Alternatively or additionally the UE may be configured with one or more of the three controlling parameters, M, N and X such as previously described.

In step C2, the UE receives indication of the selected SRS resources for the SRS transmission. This may be regarded as a first selection stage.

In some embodiments, this may be provided by a semi-persistent SRS resource set (re-)activation command which comprises the SRS resources of the set to be actually transmitted.

In other embodiments, this may be provided by dynamic aperiodic SRS resource set triggering via DCI in PDCCH indicating the SRS of the set to be actually transmitted.

In some embodiments, the dynamic aperiodic triggering and the semi-persistent command may be available at different times.

Alternatively or additionally, the UE may determine and deactivate SRS resource(s) and one or more corresponding panels. This may be within the SRS resource set for CB/NCB PUSCH that are associated to the DL RS(s). This may be for resources which have relative poor measurement results and/or resources for which the UE did not provide beam measurement result(s) to the gNB In step C4, the apparatus of the UE may cause the UE to transmit on the selected SRS resources that correspond to the selected panel(s) and beam(s) in step C3.

In step C5, the apparatus of the UE may determines that UL grant for PUSCH transmission is scheduled to the UE and cause the UE to transmit the PUSCH using TX beams corresponding to SRS resources. This may be the SRS resources indicated by a SRI (SRS resource indication) in a grant received from the gNB or other access point. The SRI may point only to SRS resources of the set indicated in step C3, in some embodiments.

In yet another embodiment, the UE determines based on above methods which SRS resources of the set are actually to be transmitted (first selection stage). The SRSs are transmitted in some embodiments prior to the scheduled PUSCH. The UE may determine that in the following uplink scheduling grant to schedule PUSCH transmission. The SRS resource indication (SRI) signalling can select (second selection stage) TX beam reference only from among the SRS resources selected in the first selection stage.

There may be a minimum timing offset between the first and second selection stages (e.g. per UE capability) so that the first selection stage result can be applied in the second selection stage. This may be so that there is always at least certain time margin for the UE to process the first selection indication before second selection state In another embodiment, deactivating certain SRS resources of the SRS resource set for CB or NCB, i.e. certain UE antenna panels, can be performed autonomously by the UE based on panel specific beam reporting on DL RSs:

The UE may determine that SRS resources are de-activated for the panels that are not among the panel(s) indicated in beam measurement reports sent to gNB within a certain time period. In other words, if the UE has not provided beam measurement reports for the certain panels (i.e. other panels are providing better beam measurement results for the configured DL RSs (DL TX beams)) the UE may deactivate the SRS resource(s) associated with those panel(s). The UE may switch off the panel and/or associated receive/transmit chain.

The UE may be configured with a parameter that defines the time period. This may be provided by a timer that re-started for each configured DL TX beam when a UE provides a measurement report for that beam. When the timer expires the UE may deactivate the panel if all the timers associated with beams for which this panel is used to perform measurements are expired.

Based on received panel specific beam reports the gNB can also assume that certain SRS resources and associated panels are deactivated at certain time.

The gNB may activate the panels via dynamic signalling. For example the gNB may signal the UE when the gNB is about to request UE to make new measurements with all the panels involved.

Alternatively or additionally, the UE may determine deactivated SRS resource(s) associated with a specific UE antenna panel according to estimated required transmission power taking into account possible required power reductions e.g. due to emission safety limits per certain spatial direction (e.g. UL TX beam points to a human body).

There may be a determining parameter value obtained from the gNB based on which the UE may make the decision. The parameter may be e.g. a power headroom calculated assuming the SRS resource transmission and if the calculated power headroom is less than given parameter value the UE may deactivate the SRS resource. This parameter is by way of example only and any other suitable parameter or metric may be used. The parameter or metric may be one which describes or is dependent on or related to the quality of the uplink link when using the respective transmission beam. In some embodiments, a plurality of parameters may be used. Alternatively or additionally, one or more parameters may be determined or available in the UE, without requiring the parameter to be obtained from the gNB. Alternatively or additionally, information may be provided from the gNB which may allow the UE to determine the value of the respective parameter.

Some embodiments may allow a UE to select one or more panels and beams that are feasible for the link between UE and gNB. Some embodiments may avoid that the UE consumes the limited TX power to SRS resource(s) (TX beam(s)) that would have a relatively poor link quality. In some scenarios, these relatively pool links might otherwise take TX power from the relatively good links to make the overall link quality between UE and gNB also poor.

Some methods of some embodiments may be implemented in a wireless communication device as described with reference to FIG. 2 and/or an apparatus of the wireless communication device and/or a control apparatus as described with reference to FIG. 3.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE and 5G NR, similar principles can be applied in relation to other networks and communication systems where there are a plurality of antenna panels.

Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some examples may be implemented in hardware, while other aspects may be implemented in firmware or software which may be executed by a controller, microprocessor or other computing device, although the invention is not limited thereto. While various aspects of embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Some embodiments may be provided by one or more components such as integrated circuit modules.

The foregoing description has provided by way of non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is one or more further embodiments comprising a combination of one or more embodiments as previously discussed.

The invention claimed is:

1. An apparatus for a communications device, the apparatus comprising at least one processor; and
at least one non-transitory memory storing instructions, that when executed by the at least one processor cause the apparatus to:
    determine one or more parameters for one or more downlink signals received with a plurality of antenna arrangements of a set of antenna arrangements;

determine using said determined one or more parameters a subset of said set of antenna arrangements; and cause the communications device to transmit to an access point using the subset of said set of antenna arrangements, the subset of said set of antenna arrangements being selected based on the determined one or more parameters.

2. An apparatus as claimed in claim 1, wherein said at least one non-transitory memory storing instructions is executed by the at least one processor to cause the apparatus to determine the subset of said set of antenna arrangements taking into account one or more transmit power back off requirements to be applied with said communications device.

3. An apparatus as claimed in claim 1, wherein said determining uses one or more threshold values.

4. An apparatus as claimed in claim 3, wherein the at least one non-transitory memory storing instructions is executed by the at least one processor to cause the apparatus to receive one or more of said one or more threshold values from the access point.

5. An apparatus as claimed in claim 1, wherein the at least one non-transitory memory storing instructions is executed by the at least one processor to cause the apparatus to:
cause information about said one or more parameters for said one or more of said subset of antenna arrangements to be transmitted to the access point; and
receive information from the access point indicating said subset of antenna arrangements which are to be used to transmit to said access point.

6. An apparatus as claimed in claim 5, wherein said received information comprises information assigning one or more resources to respective ones of said antenna arrangements of said subset of antenna arrangements.

7. An apparatus as claimed in claim 5, wherein said received information comprises information relating to a sounding reference signal set for each of said antenna arrangements.

8. An apparatus as claimed in claim 5, wherein said at least one non-transitory memory storing instructions is executed by the at least one processor to cause the apparatus to select one or more antenna arrangements, from said subset of antenna arrangements indicated in said information received from said access point, to be used to transmit to said access point.

9. An apparatus as claimed in claim 5, wherein said at least one non-transitory memory storing instructions is executed by the at least one processor to cause the apparatus to receive information from said access point indicating one or more of: a maximum number of results to be reported to said access point; a maximum number of results which can be from a same antenna arrangement; or a criteria with which results to be reported to said access point are selected.

10. An apparatus as claimed in claim 1 wherein said one or more parameters comprise one or more path loss parameters.

11. An apparatus as claimed in claim 1, wherein said at least one non-transitory memory storing instructions is executed by the at least one processor to cause the apparatus to send information to said access point indicating a number of antenna arrangements which said communication device has.

12. An apparatus as claimed in claim 1, wherein said at least one non-transitory memory storing instructions is executed by the at least one processor to cause the apparatus to send information to said access point indicating that said communications device supports selective use of one or more antenna arrangements of said set of antenna arrangements.

13. An apparatus as claimed in claim 1, wherein said at least one non-transitory memory storing instructions is executed by the at least one processor to cause the apparatus to deactivate one or more of said antenna arrangements.

14. An apparatus as claimed in claim 13, wherein said at least one non-transitory memory storing instructions is executed by the at least one processor to cause the apparatus to deactivate said one or more antenna arrangements when information associated with the respective antenna arrangement is not being reported to the access point.

15. An apparatus for an access point comprising at least one processor; and
at least one non-transitory memory storing instructions, that when executed by the at least one processor to cause the apparatus to:
receive information about one or more parameters for one or more downlink signals received with a plurality of antenna arrangements of a set of antenna arrangements of a communication device; and
cause information to be transmitted from the access point to said communication device, said information indicating a subset of antenna arrangements which are to be used with said communication device to transmit to said access point.

16. A method comprising:
determining one or more parameters for one or more downlink signals received with a plurality of antenna arrangements of a set of antenna arrangements of a communication device;
determining using said determined one or more parameters a subset of said set of antenna arrangements; and
causing the communication device to transmit to an access point using the subset of said set of antenna arrangements, the subset of said set of antenna arrangements being selected based on the determined one or more parameters.

* * * * *